(12) United States Patent
Song et al.

(10) Patent No.: US 12,615,077 B2
(45) Date of Patent: *Apr. 28, 2026

(54) CSI REPORT CONFIGURATION METHOD, TERMINAL DEVICE, AND NETWORK DEVICE

(71) Applicant: VIVO MOBILE COMMUNICATION CO., LTD., Dongguan (CN)

(72) Inventors: Yang Song, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 42 days.

This patent is subject to a terminal disclaimer.

(21) Appl. No.: 18/660,220

(22) Filed: May 9, 2024

(65) Prior Publication Data

US 2024/0291539 A1 Aug. 29, 2024

Related U.S. Application Data

(63) Continuation of application No. 17/171,961, filed on Feb. 9, 2021, now Pat. No. 12,015,463, which is a
(Continued)

(30) Foreign Application Priority Data

Aug. 14, 2018 (CN) .......................... 201810925320.6

(51) Int. Cl.
*H04B 7/06* (2006.01)
*H04L 5/00* (2006.01)
(52) U.S. Cl.
CPC ......... *H04B 7/0626* (2013.01); *H04B 7/0639* (2013.01); *H04L 5/0053* (2013.01); *H04L 5/0091* (2013.01)

(58) Field of Classification Search
CPC ... H04B 7/0626; H04B 7/0639; H04L 5/0053; H04L 5/0091
See application file for complete search history.

(56) References Cited

U.S. PATENT DOCUMENTS

| | | | |
|---|---|---|---|
| 11,101,949 B2 | 8/2021 | Park | |
| 2014/0056156 A1 | 2/2014 | Jongren | |

(Continued)

FOREIGN PATENT DOCUMENTS

| | | |
|---|---|---|
| CN | 101789849 A | 7/2010 |
| CN | 106559113 A | 4/2017 |

(Continued)

OTHER PUBLICATIONS

International Search Report issued in corresponding International Application No. PCT/CN2019/099198, mailed Oct. 28, 2019, 4 pages.
(Continued)

*Primary Examiner* — Kenny S Lin
(74) *Attorney, Agent, or Firm* — IPX PLLC

(57) ABSTRACT

A channel state information (CSI) report configuration method, a network device, and a non-transitory computer readable storage medium thereof are provided. The method includes sending a CSI report configuration and at least one CSI resource configuration. The CSI resource configuration indicates a CSI resource set that includes multiple CSI resource subsets. The multiple CSI resource subsets correspond to quasi co-located (QCL) CSI resources with different spatial properties respectively. The method further includes receiving a CSI report including report information determined based on the multiple CSI resource subsets.

20 Claims, 3 Drawing Sheets

Related U.S. Application Data continuation of application No. PCT/CN2019/099198, filed on Aug. 5, 2019.

(56)                    References Cited

U.S. PATENT DOCUMENTS

| | | | |
|---|---|---|---|
| 2016/0050050 A1 | 2/2016 | Kang | |
| 2016/0142189 A1 | 5/2016 | Shin | |
| 2017/0244533 A1 | 8/2017 | Onggosanusi | |
| 2017/0245165 A1 | 8/2017 | Onggosanusi et al. | |
| 2017/0373745 A1* | 12/2017 | Park | H04B 7/0479 |
| 2018/0034612 A1 | 2/2018 | Lin | |
| 2018/0242327 A1 | 8/2018 | Frenne | |
| 2018/0262313 A1 | 9/2018 | Nam | |
| 2018/0278313 A1 | 9/2018 | Kim | |
| 2019/0069285 A1 | 2/2019 | Chandrasekhar | |
| 2020/0112359 A1* | 4/2020 | Park | H04L 5/0053 |
| 2020/0204239 A1 | 6/2020 | Kang | |
| 2020/0244320 A1 | 7/2020 | Wang | |

FOREIGN PATENT DOCUMENTS

| | | |
|---|---|---|
| CN | 108039903 A | 5/2018 |
| WO | 2018026241 A1 | 2/2018 |
| WO | 2018083253 A1 | 5/2018 |
| WO | 2018143697 A1 | 8/2018 |

OTHER PUBLICATIONS

Nokia., "CR to 38.214: maintenance according to agreed Rel 15 features.", 3GPP TSG-RAN1 Meeting #93 , R1-1807968.,May 25, 2018, sections 5.1.5 and 5.1.6.2.

Huawei et al., "Enhancements on multi-TRP/panel transmission in NR.", 3GPP TSG RAN WG1 Meeting #94 , R1-1809117., Aug. 11, 2018.

Mediatek Inc., "Remaining Issues in CSI Aacquisition.", 3GPP TSG RAN WG1 Meeting #94 , R1-1808263, , Aug. 11, 2018.

Search Report issued in related Application No. 201810925320.6, mailed Apr. 27, 2020, 6 pages.

Second Office Action issued in related Chinese Application No. 201810925320.6, mailed Jul. 8, 2021, 17 pages.

Ericsson, "CSI feedback for multi-TRP", 3GPP TSG RAN WG1 Meeting 90bis, R1-1718737, mailed Oct. 13, 2017.

Third Office Action issued in related Chinese Application No. 201810925320.6, mailed Oct. 27, 2021, 5 pages.

* cited by examiner

100
| Send a CSI report configuration and at least one CSI resource configuration | ~ S110 |
FIG. 1
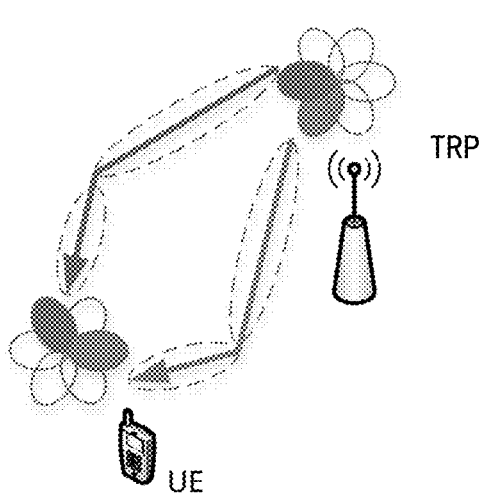
FIG. 2
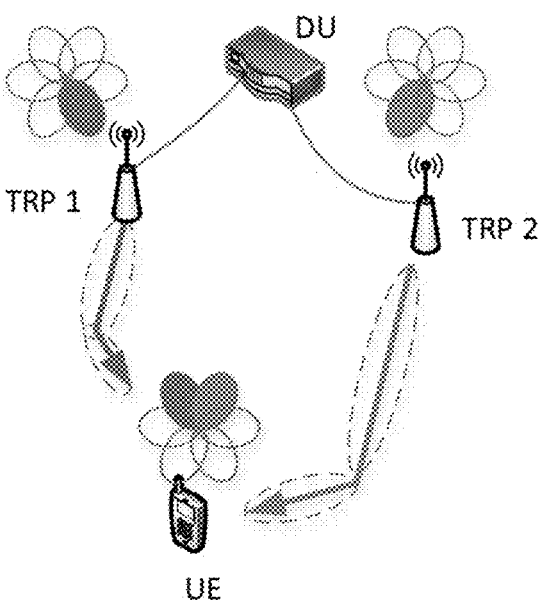
FIG. 3

500

Receive a CSI report configuration and at least one CSI resource configuration ~ S510

Determine a CSI report based on the CSI report configuration and the at least one CSI resource configuration ~ S520

Send the CSI report ~ S530

Terminal device 600

Receiving module ~ S610

Determining module ~ S620

Sending module ~ S630

CSI REPORT CONFIGURATION METHOD, TERMINAL DEVICE, AND NETWORK DEVICE

CROSS-REFERENCE TO RELATED APPLICATIONS

The present disclosure is continuation of U.S. application Ser. No. 17/171,961 filed Feb. 9, 2021, which is a bypass continuation of PCT Application No. PCT/CN2019/099198 filed Aug. 5, 2019, which further claims priority to Chinese Patent Application No. 201810925320.6 filed Aug. 14, 2018, all of which are incorporated herein by reference in their entireties.

TECHNICAL FIELD

The present disclosure relates to the communications field, and in particular, to a channel state information (CSI) report configuration method, a terminal device and a network device.

BACKGROUND

In order to improve transmission reliability and throughput performance, a scenario of multi-TRP/multi-panel is proposed in 3GPP Rel-15. In the scenario of multi-TRP/multi-panel, a terminal device can receive the same data or different data from multiple TRPs, thereby improving transmission reliability or throughput performance.

The related Rel-15 protocol specifies a relevant CSI report configuration solution for a single TRP, but CSI resources with different spatial properties (for example, in a scenario of multi-TRP/multi-panel) are not taken into consideration. For this reason, it is necessary to provide a relevant CSI report configuration solution to resolve the problem that a CSI report configuration under CSI resources with different spatial properties cannot be implemented.

SUMMARY

An objective of embodiments of the present disclosure is to provide a CSI report configuration method, a terminal device and a network device, to resolve the problem that a CSI report configuration under CSI resources with different spatial properties cannot be implemented.

According to a first aspect, a CSI report configuration method is provided, where the method is executed by a network device, and the method includes: sending a CSI report configuration and at least one CSI resource configuration.

According to a second aspect, a CSI report configuration method is provided, where the method is executed by a terminal device, and the method includes: receiving a CSI report configuration and at least one CSI resource configuration, determining a CSI report based on the CSI report configuration and the at least one CSI resource configuration, and sending the CSI report.

According to a third aspect, a network device is provided, where the network device includes a sending module configured to send a CSI report configuration and at least one CSI resource configuration.

According to a fourth aspect, a terminal device is provided, where the terminal device includes: a receiving module configured to receive a CSI report configuration and at least one CSI resource configuration; a determining module configured to determine a CSI report based on the CSI report configuration and the at least one CSI resource configuration; and a sending module configured to send the CSI report.

According to a fifth aspect, a network device is provided, where the network device includes a processor, a memory, and a computer program that is stored on the memory and that can run on the processor, where steps of the CSI report configuration method according to the first aspect are implemented when the computer program is executed by the processor.

According to a sixth aspect, a terminal device is provided, where the terminal device includes a processor, a memory, and a computer program that is stored on the memory and that can run on the processor, where steps of the CSI report configuration method according to the first aspect are implemented when the computer program is executed by the processor.

According to a seventh aspect, a computer readable storage medium is provided, where a computer program is stored in the computer readable storage medium, where steps of the CSI report configuration methods according to the first aspect and the second aspect are implemented when the computer program is executed by a processor.

In embodiments of the present disclosure, a network device can send, to a terminal device, a CSI report configuration and a CSI resource configuration, which are further used to indicate a CSI report configuration and a CSI resource for the terminal device, resolving the problem that a CSI report configuration under CSI resources with different spatial properties cannot be implemented, avoiding the transmission problem caused by inconsistent understanding of transmission between the terminal device and the network device, and enhancing communications effectiveness.

BRIEF DESCRIPTION OF DRAWINGS

The accompanying drawings illustrated herein are provided to further understand the present disclosure and form a part of the present disclosure. The exemplary embodiments of the present disclosure and the descriptions thereof are used to explain the present disclosure and do not constitute an improper limitation on the present disclosure. In the accompanying drawings:

FIG. 1 is a schematic flowchart of a CSI report configuration method according to some embodiments of the present disclosure;

FIG. 2 is a schematic diagram of an application scenario of a CSI report configuration method according to some embodiments of the present disclosure;

FIG. 3 is another schematic diagram of an application scenario of a CSI report configuration method according to some embodiments of the present disclosure;

DETAILED DESCRIPTION

Figure 4:
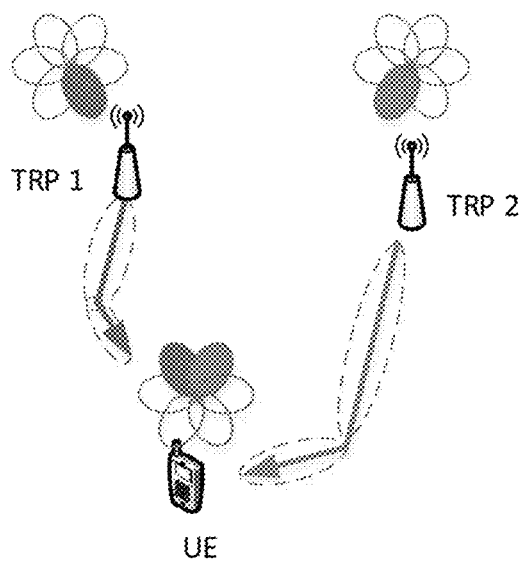
FIG. 4 is yet another schematic diagram of an application scenario of a CSI report configuration method according to some embodiments of the present disclosure.

To make the objectives, technical solutions, and advantages of the present disclosure clearer, the following clearly describes the technical solutions of the present disclosure with reference to the corresponding accompanying drawings and embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

It should be understood that the technical solutions according to the embodiments of the present disclosure can be applied to various communications systems, such as a Global System for Mobile Communications (GSM) system, a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, LTE Time Division Duplex (TDD), a Universal Mobile Telecommunications System (UMTS) or a Worldwide Interoperability for Microwave Access (WiMAX) communications system, a 5G system, or a New Radio (NR) system, or a subsequent evolution communications system.

In the embodiments of the present disclosure, a terminal device may include, but is not limited to, a mobile station (MS), a mobile terminal, a mobile telephone, user equipment (UE), a handset or portable equipment, a vehicle, or the like. The terminal device can communicate with multiple core networks via a radio access network (RAN), for example, the terminal device may be a mobile phone (or what is called a "cellular" phone), a computer with a radio communications function, and the terminal device may also be a portable, pocket-sized, handheld, computer-built-in or vehicle-mounted mobile apparatus.

In the embodiments of the present disclosure, a network device is an apparatus deployed in a radio access network to provide a radio communications function for a terminal device. The network device may be a base station, and the base station may include various types of macro base stations, micro base stations, relay nodes, and access points. In systems employing different radio access technologies, names of devices with a base-station function may be different. For example, what is called an evolved NodeB (eNB or eNodeB) in an LTE network is called a Node B in a 3rd generation (3G) network, or a network device in a subsequent evolution communications system, but the wording does not constitute a restriction.

As shown in FIG. 1, some embodiments of the present disclosure provide a CSI report configuration method. The method may be executed by a network device, and includes the following steps:

S110: Send a CSI report configuration and at least one CSI resource configuration.

The foregoing CSI resource configuration may be used to indicate a CSI resource for a terminal device, for example, indicating a CSI resource for multiple TRPs, and specifically, indicating a CSI resource configuration for the foregoing multiple TRPs (CSI resource setting/CSIResourceConfig signaling of RRC), or multiple CSI resource sets in one CSI resource configuration or multiple CSI resource subsets in a certain CSI resource set in one CSI resource configuration; the CSI report configuration may be used to indicate a CSI report configuration for a terminal device, and specifically, may be used to indicate a CSI report configuration for the foregoing multiple TRPs.

The foregoing CSI resources, for example, include a non-zero power channel state information-reference signal (NZP-CSI-RS) resources, a channel state information interference measurement (CSI-IM) resources, where one CSI-RS resource (including the foregoing NZP-CSI-RS resource, and the same subsequently) is used to configure a quantity of CSI-RS ports and information on a time-frequency location, and the like; and one CSI-IM resource is used to configure information on a time-frequency location of CSI-IM, and the like.

Alternatively, a CSI report corresponding to the foregoing CSI report configuration is jointly determined by quasi-colocated (QCL) CSI resources with different spatial properties.

In the CSI report configuration method provided by the embodiments of the present disclosure, the network device can send, to a terminal device, a CSI report configuration and a CSI resource configuration, which are further used to indicate a CSI report configuration and a CSI resource for the terminal device, resolving the problem that a CSI report configuration under CSI resources with different spatial properties cannot be implemented, avoiding the transmission problem caused by inconsistent understanding of transmission between the terminal device and the network device, and enhancing communications effectiveness.

As shown in FIGS. 2-4, FIGS. 2-4 schematically show several application scenarios of the CSI report configuration method provided by the embodiments of the present disclosure.

FIG. 2 schematically shows transmission of multiple panels between a TRP and UE in a same TRP, and the multiple panels correspond to quasi-colocated (Quasi-Co-Location, QCL) CSI resources with different spatial properties.

In FIG. 3, TRP1 and TRP2 are connected to a distribution unit DU through low-latency lines such as optical fiber lines, that is, multi-TRP/multi-panel transmission between multiple TRPs in an ideal loop, and multi-TRP/multi-panel correspond to QCL CSI resources with different spatial properties.

FIG. 4 schematically shows multi-TRP/multi-panel transmission between multiple TRPs in a non-ideal loop, and multiple TRPs/panels correspond to QCL CSI resources with different spatial properties.

In the foregoing several multi-TRP/multi-panel application scenarios, a network device can send, to a terminal device, a CSI report configuration and a CSI resource configuration, which are further used to indicate a CSI resource and a CSI report configuration for multiple TRPs.

The terminal device can receive CSI-RS, CSI-IM and the like based on the foregoing CSI resources, then generate a CSI report after performing measurement and calculation on the CSI-RS, the CSI-IM and the like, and send it to the network device, where the CSI report generally includes at least one of the following: a channel state information-reference resource index CRI, CSI resource quality corresponding to the CRI, a rank indicator (RI), a precoding matrix indicator (PMI), and a channel quality indicator (CQI). In this way, after receiving the CSI report, the network device can select an appropriate precoding matrix and modulation and coding scheme level in the subsequent transmission process for the terminal device, thereby improving communications efficiency.

In the foregoing multi-TRP/multi-panel application scenario, the network device can configure multiple CSI report configurations for each TRP, and alternatively, the network device may also configure one CSI report configuration for each TRP, which will be described in the following in combination with several specific embodiments for the purpose of detailed description.

1) The Network Device Configures Multiple CSI Report Configurations for Each TRP:

In this embodiment, the multiple CSI report configurations correspond to multiple TRPs respectively, and the CSI report configurations and TRPs may be in a one-to-one correspondence relationship; in addition, one or more CSI resource configurations associated with each CSI report configuration correspond to one TRP.

In this embodiment, the network device may configure one CSI report configuration for each TRP, and one or more CSI resource configurations associated with each CSI report configuration correspond to one TRP.

In this embodiment, the terminal device may perform a CSI report for each TRP according to the CSI report configuration of the TRP, and one CSI report configuration corresponds to one CSI report for the TRP.

According to this embodiment, there is no need to modify related protocol, and the CSI report for each TRP is transparent to the terminal device, that is, it is unknown to the terminal device which TRP corresponds to the CSI report configuration and the CSI resource configuration, and the terminal device only performs CSI measurement and CSI calculation according to multiple CSI report configurations and one or more CSI resource configurations associated with each CSI report configuration, and generates their respective CSI reports.

Alternatively, CSI reports of multiple TRPs in this embodiment may be configured as: a periodic CSI report (P-CSI), which is only transmitted on a physical uplink control channel (PUCCH); a semi-persistent CSI report (SP-CSI), which is transmitted on a PUCCH or a physical uplink shared channel (PUSCH); and an aperiodic CSI report (AP-CSI), which is only transmitted on a PUSCH.

2) The Network Device Configures One CSI Report Configuration for Each TRP:

In this embodiment, CSI reports of multiple TRPs are configured in one CSI report configuration, that is, one CSI report configuration indicates CSI reports of multiple TRPs, that is, CSI reports corresponding to one CSI report configuration are jointly determined by quasi-co-located (QCL) CSI resources with different spatial properties. The detailed description will be made in the following with three examples a, b, and c.

a. One CSI report configuration is associated with multiple CSI resource configuration groups, each CSI resource configuration group includes at least one CSI resource configuration, and the multiple CSI resource configuration groups correspond to QCL CSI resources with different spatial properties respectively. Specifically, the multiple CSI resource configuration groups correspond to the multiple TRPs respectively. For example, the CSI resource configuration groups and the TRPs are in a one-to-one correspondence relationship.

In this example, the foregoing CSI report configuration can instruct the terminal device to calculate a CSI report based on multiple CSI resource configuration groups. The CSI report corresponding to one CSI report configuration includes all CSIs of TRP or some CSIs of TRP in the foregoing multiple TRPs.

Alternatively, each CSI resource configuration group of the foregoing multiple CSI resource configuration groups may include one to three CSI resource configurations, where:

if each CSI resource configuration group includes one CSI resource configuration, the CSI resource configuration is used for measuring CSI resource quality of a channel, for example, measuring L1-reference signal received power L1-RSRP, L1-reference signal received quality L1-RSRQ or signal-to-interference ratio SINR, and the like;

if each CSI resource configuration group includes two CSI resource configurations, a first CSI resource configuration of the two CSI resource configurations is used for channel measurement, and a second CSI resource configuration is used for interference measurement based on channel state information interference measurement (CSI-IM) or interference measurement based on non-zero power channel state information-reference signal (NZP-CSI-RS); and if each CSI resource configuration group includes three CSI resource configurations, a first CSI resource configuration of the three CSI resource configurations is used for channel measurement, a second CSI resource configuration is used for CSI-IM-based interference measurement, and a third CSI resource configuration is used for NZP-CSI-RS-based interference measurement.

Alternatively, before performing example a, the network device may also send configuration information for configuring a CSI resource configuration group, and the configuration information for configuring a CSI resource configuration group may specifically be included in a CSI resource configuration or a CSI report configuration.

The configuration information for configuring a CSI resource configuration group may be used to indicate a quantity of CSI resource configuration groups. Additionally, the configuration information for configuring a CSI resource configuration group may be used to indicate a quantity of CSI resource configurations in each CSI resource configuration group, and/or information about a correspondence relationship between a CSI resource configuration group and a CSI resource configuration, and the like.

In another implementation manner, a quantity of the foregoing CSI resource configuration groups, a quantity of CSI resource configurations in each CSI resource configuration group, and/or information about a correspondence relationship between a CSI resource configuration group and a CSI resource configuration may also be specified in a protocol.

Alternatively, in this example a, the network device may also send channel state information-reference resource index CRI indication information to the terminal device.

The foregoing CRI indication information may be used to instruct the terminal device to send multiple groups of CRIs and/or CSI resource quality corresponding to each CRI in the multiple groups of CRIs, where the multiple groups of CRIs correspond to all CSI resource configuration groups or some CSI resource configuration groups of the multiple CSI resource configuration groups, which may specifically be a one-to-one correspondence relationship. For the foregoing CSI resource quality, for example, including L1-RSRP, reference signal received quality (RSRQ), or signal-to-interference plus noise ratio (SINR), this embodiment enables a terminal to independently select some TRPs or all TRPs to report CRI according to the condition of a channel to each TRP.

Each of the foregoing groups of CRIs may include only one CRI, which is used to indicate an optimal transmission beam for a corresponding TRP. Alternatively, in the case that there is only one CSI resource in a CSI resource set, CRI may not be reported, thereby reducing resource consumption.

Alternatively, the CRI indication information can also instruct the terminal device to send one group of CRIs and/or CSI resource quality corresponding to each CRI in the one group of CRIs, where the one group of CRIs correspond to one CSI resource configuration group of the multiple CSI resource configuration groups. In this embodiment, the terminal device may only report the best TRP for CRI reporting; or alternatively, the CRI indication information instructs the terminal device to send one group of CRIs and/or CSI resource quality corresponding to each CRI in the one group of CRIs, where the one group of CRIs correspond to the multiple CSI resource configuration groups. In this embodiment, the terminal device may report the best multiple CRIs of all TRPs uniformly, and the reported CRIs may correspond to a same TRP.

b. A CSI resource configuration associated with one CSI report configuration includes multiple CSI resource sets, and the multiple CSI resource sets correspond to QCL CSI resources with different spatial properties. Specifically, multiple CSI resource sets correspond to multiple TRPs, for example, multiple CSI resource sets in a CSI resource configuration associated with one CSI report configuration may be in a one-to-one correspondence relationship with multiple TRPs.

In this example, the foregoing CSI report configuration can instruct the terminal device to calculate one CSI report based on multiple CSI resource sets, and a CSI report corresponding to one CSI report configuration includes CSIs of the multiple TRPs.

Specifically, a CSI resource configuration associated with one CSI report configuration includes S>1 CSI resource sets (resource set), multiple resource sets correspond to the foregoing multiple TRPs respectively, and each resource set corresponds to a different TRP.

Alternatively, before performing this example b, the network device may also send configuration information for configuring a CSI resource set, and the configuration information may specifically be included in a CSI resource configuration or a CSI report configuration.

The foregoing configuration information for configuring a CSI resource set may be used to indicate a quantity of multiple CSI resource sets, and may also be used to indicate a quantity of CSI resources in each CSI resource set, and/or a correspondence relationship between a CSI resource set and a CSI resource, and the like.

In another implementation manner, a quantity of the foregoing CSI resource sets; a quantity of CSI resources in each CSI resource set, and/or information about a correspondence relationship between a CSI resource set and a CSI resource, and the like may also be specified in a protocol.

Alternatively, in this example b, the network device may also send CRI indication information to the terminal device, and the CRI indication information may be used to instruct the terminal device to send multiple groups of CRIs and/or CSI resource quality corresponding to each CRI in the multiple groups of CRIs, where the multiple groups of CRIs correspond to all CSI resource sets or some CSI resource sets in the multiple CSI resource sets, which may specifically be a one-to-one correspondence relationship. For the foregoing CSI resource quality, for example, including L1-RSRP, RSRQ, SINR, this embodiment enables a terminal to independently select some TRPs or all TRPs to report CRI according to the condition of a channel to each TRP.

Each of the foregoing groups of CRIs may include one CRI, which is used to indicate an optimal transmission beam for a corresponding TRP. Alternatively, in the case that there is only one CSI resource in the CSI resource set, CRI may not be reported, thereby reducing resource consumption.

Alternatively, the CRI indication information can also instruct the terminal device to send one group of CRIs and/or CSI resource quality corresponding to each CRI in the one group of CRIs, where the one group of CRIs correspond to one CSI resource set in the multiple CSI resource sets. In this embodiment, the terminal device may only report the best TRP for CRI reporting; or alternatively, the CRI indication information instructs the terminal device to send one group of CRIs and/or CSI resource quality corresponding to each CRI in the one group of CRIs, where the one group of CRIs correspond to the multiple CSI resource sets. In this implementation manner, the terminal device may report the best multiple CRIs of all TRPs uniformly, and the reported CRIs may come from different TRPs.

Alternatively, in this example b, if the foregoing CSI report configuration is associated with a CSI-IM-based CSI resource configuration, this example b may further include the following steps: configuring a CSI-IM-based CSI resource for the terminal device according to a correspondence relationship between a CSI resource for channel measurement and a CSI-IM-based CSI resource.

For the foregoing correspondence relationship between a CSI resource for channel measurement and a CSI-IM-based CSI resource, for example, multiple CSI resource sets in one CSI resource configuration for channel measurement are in a one-to-one correspondence relationship with multiple CSI resource sets in one CSI-IM-based CSI resource configuration; a CSI resource in one CSI resource set for channel measurement is in a one-to-one correspondence relationship with a CSI resource in one CSI-IM-based CSI resource set. It's sure that the embodiments of the present disclosure are not limited to the foregoing correspondence relationships.

Alternatively, in this example b, if the CSI report configuration is associated with a CSI resource configuration for NZP-CSI-RS-based interference measurement, this example b may further include the following steps:

According to a correspondence relationship between a CSI resource for channel measurement and a CSI resource for NZP-CSI-RS-based interference measurement, configure the terminal device with a CSI resource for NZP-CSI-RS-based interference measurement.

For the foregoing correspondence relationship between a CSI resource for channel measurement and a CSI resource for NZP-CSI-RS-based interference measurement, for example, one CSI resource set in a CSI resource configuration for channel measurement corresponds to one or more CSI resource sets in a CSI resource configuration for NZP-CSI-RS-based interference measurement; and one CSI resource in a CSI resource set for channel measurement corresponds to multiple CSI resources in a CSI resource set for NZP-CSI-RS-based interference measurement.

c. One CSI resource set in a CSI resource configuration associated with one CSI report configuration includes multiple CSI resource subsets, and the multiple CSI resource subsets correspond to QCL CSI resources with different spatial properties respectively. Specifically, the multiple CSI resource subsets may correspond to the multiple TRPs respectively.

In this embodiment, the foregoing CSI report configuration can instruct a terminal device to calculate a CSI report based on the multiple CSI resource subsets, and a CSI report corresponding to one CSI report configuration is jointly determined by CSI resources for the multiple TRPs.

In this embodiment, division of the CSI resource subsets may be specified based on a protocol, or configured by radio resource control (RRC), media access layer control element (MAC CE) or downlink control information (DCI). Specifically, a quantity of divided CSI resource subsets, a quantity of CSI resources in each CSI resource subset and the like can be indicated under the foregoing protocol or configuration.

Alternatively, before performing the example c, the network device may also send configuration information for configuring a CSI resource subset, which is further used to indicate a quantity of multiple CSI resource subsets and a quantity of CSI resources in each CSI resource subset, and/or information about a correspondence relationship between a CSI resource subset and a CSI resource.

Alternatively, division of CSI resource subsets is determined based on a quantity of configured CRIs. For example, if N groups of CRI reports are configured, it means that one CSI resource set is divided into N CSI resource subsets.

Alternatively, in this example c, the network device may also send CRI indication information to the terminal device, and the CRI indication information may be used to instruct the terminal device to send multiple groups of CRIs and/or CSI resource quality corresponding to each CRI in the multiple groups of CRIs, where the multiple groups of CRI are in a one-to-one correspondence relationship with the multiple CSI resource subsets, or the multiple groups of CRIs are in a one-to-one correspondence relationship with some CSI resource subsets in the multiple CSI resource subsets. For the foregoing CSI resource quality, for example, including L1-RSRP, RSRQ, SINR, this embodiment enables a terminal to independently select some TRPs or all TRPs to report CRI according to the condition of a channel to each TRP.

Each of the foregoing groups of CRIs may include one CRI, which is used to indicate an optimal transmission beam for a corresponding TRP. Alternatively, in the case that there is only one CSI resource in the CSI resource set, CRI may not be reported, thereby reducing resource consumption.

Alternatively, the CRI indication information can also instruct the terminal device to send one group of CRIs and/or CSI resource quality corresponding to each CRI in the one group of CRIs, where the one group of CRIs correspond to one CSI resource subset of the multiple CSI resource subsets, and in this implementation manner, the terminal device may only report the best TRP for CRI reporting; or alternatively, the CRI indication information instructs the terminal device to send one group of CRIs and/or CSI resource quality corresponding to each CRI in the one group of CRIs, where the one group of CRIs correspond to the multiple CSI resource sets. In this embodiment, the terminal device may report the best multiple CRIs of all TRPs uniformly, and the reported CRIs may come from different TRPs.

Alternatively, in this embodiment, if the foregoing CSI report configuration is associated with a CSI-IM-based CSI resource configuration, this example c may further include the following steps: configuring a CSI-IM-based CSI resource for the terminal device according to a correspondence relationship between a CSI resource for channel measurement and a CSI-IM-based CSI resource.

For the foregoing correspondence relationship between a CSI resource for channel measurement and a CSI-IM-based CSI resource, for example, CSI resource subsets for channel measurement are in a one-to-one correspondence relationship with CSI resource subsets for CSI-IM-based interference measurement; CSI resources in the CSI resource subsets for channel measurement are in a one-to-one correspondence relationship with CSI resources in the CSI-IM-based CSI resource subsets. It is sure that embodiments of the present disclosure are not limited to the foregoing correspondence relationship.

Alternatively, in this embodiment, if the CSI report configuration is associated with a CSI resource configuration for NZP-CSI-RS-based interference measurement, this example c may further include the following steps:

according to a correspondence relationship between a CSI resource for channel measurement and a CSI resource for NZP-CSI-RS-based interference measurement, configuring the terminal device with a CSI resource for NZP-CSI-RS-based interference measurement.

For the correspondence relationship between a CSI resource for channel measurement and a CSI resource for NZP-CSI-RS-based interference measurement, for example, a CSI resource subset for channel measurement corresponds to one or more CSI resource subsets for NZP-CSI-RS-based interference measurement; one CSI resource in the CSI resource subset for channel measurement corresponds to multiple CSI resources in the NZP-CSI-RS-based CSI resource subset.

Alternatively, the CSI report configuration method provided by the foregoing embodiments of the present disclosure may be specifically applied as follows:

1) Multiple TRPs jointly send one physical downlink shared channel (PDSCH), which can specifically be categorized into: each TRP sending a different layer of one transmission block (TB); each TRP sending one TB, each TRP sending a different TB; or each TRP sending a same TB in a repeated manner.

2) Multiple TRPs send multiple PDSCHs, and each TRP sends one PDSCH.

In the foregoing examples a, b, and c, the network device may configure one CSI report configuration, which makes it in default or indicates that one CSI report is calculated jointly by multiple CSI resource configurations or multiple CSI resources, and in particular, one CQI is jointly calculated.

In one CSI report, the terminal device can obtain one PMI and/or RI according to a CSI resource configuration or CSI resource determined by a CRI, and then determine one CQI based on these PMI/RI individually or jointly.

Alternatively, the network device may further configure a maximum quantity of respective CRI, PMI, RI, and CQI reports. In this way, the terminal device can independently determine a quantity of CRIs to be reported according to a signal strength, interference, and the like, so as to determine a quantity of PMI/RI/CQI reports. For example, a quantity of the foregoing multiple TRPs is N, and a quantity of CRIs to be reported determined independently by the terminal device is M, where both M and N are positive integers, and $M \leq N$. The non-reported N-M TRPs have greater interference when $M < N$, and the terminal device does not make a report, thereby saving resources.

Alternatively, the CSI report configuration instructs a terminal device to calculate one CSI report based on multiple CSI resource configurations or multiple CSI resources;

or makes the terminal device to calculate one CSI report based on multiple CSI resource configurations or multiple CSI resources in accordance with protocol provisions. A CSI report corresponding to one CSI report configuration is jointly determined by QCL CSI resources with different spatial properties.

Alternatively, the foregoing one CSI report includes at least one of the following: first report information and a channel quality indicator (CQI) jointly determined by multiple CRIs, CSI resource quality corresponding to the multiple CRIs, a rank indicator (RI), and a precoding matrix indicator (PMI). The multiple CRIs mentioned here and the CSI resource quality corresponding to the multiple CRIs are each taken out of the following multiple groups of CRIs and CSI resource quality corresponding to the multiple CRIs.

Specifically, a first report information includes: multiple groups of CRIs, CSI resource quality corresponding to the multiple groups of CRIs, multiple RIs, and multiple PMIs, and the first report information is determined by a preset CSI resource configuration group of the multiple CSI resource configuration groups, or is determined by a preset CSI resource set of the multiple CSI resource sets, or is determined by a preset CSI resource subset of the multiple CSI resources subsets.

The preset CSI resource configuration group mentioned here may be all the CSI resource configuration groups, or some CSI resource configuration groups selected from all the CSI resource configuration groups, for example, using a CSI resource configuration group corresponding to multiple TRPs with better signal quality as the preset CSI resource configuration group. The preset CSI resource set and the preset CSI resource subset are similar to the foregoing preset CSI resource configuration group, and will no longer be described here.

Alternatively, the foregoing one CSI report includes at least one of the following: second report information and a CQI jointly determined by one CRI, CSI resource quality corresponding to the one CRI, an RI, and a PMI, The second report information includes: one group of CRIs, CSI resource quality corresponding to the one group of CRIs, one RI, and one PMI, where the second report information is determined by one CSI resource configuration group of the multiple CSI resource configuration groups, or determined by one CSI resource set of the multiple CSI resource sets, or determined by one CSI resource subset of the multiple CSI resource subsets.

The one CSI resource configuration group of the multiple CSI resource configuration groups mentioned here may specifically be a CSI resource configuration group corresponding to the TRP with the best signal quality. The one CSI resource set of the multiple CSI resource sets and the one CSI resource subset of the multiple CSI resource subsets are similar to it, and will no longer be described here.

Alternatively, the one CSI report includes at least one of the following: third report information and a channel quality indicator (CQI) jointly determined by multiple CRIs, CSI resource quality corresponding to the multiple CRIs, the one RI and one PMI, where the third report information includes: one group of CRIs, CSI resource quality corresponding to the one group of CRIs, one RI, and one PMI, and the third report information is jointly determined by the multiple CSI resource configuration groups, determined by the multiple CSI resource sets, or determined by the multiple CSI resource subsets.

The "one group of CRIs and CSI resource quality corresponding to the one group of CRIs" mentioned in the foregoing embodiments of this specification may be configured according to the network device, and may include N (N is greater than or equal to 1) report values.

The foregoing CSI report configuration methods, several typical configurations and application scenarios provided by the embodiments of the present disclosure are shown in the following table:

| PMI | RI | CQI | Application Scenario |
|---|---|---|---|
| M pcs corresponding to each CRI respectively | M pcs corresponding to each PMI respectively | M pcs corresponding to each PMI respectively | Multi-TB single-TB repeated Multi-PDSCH |
| M pcs corresponding to each CRI respectively | M pcs corresponding to each PMI respectively | I pcs Jointly calculated | Single TB multi-layer, non-coherent joint transmission (NCJT) |
| M pcs corresponding to each CRI respectively | I pcs corresponding to each PMI respectively | I pcs Jointly calculated | Single TB multi-layer, coherent joint transmission (CJT) |
| M = I pcs Corresponding to a sent TRP | I pcs | I pcs | Dynamic Point Selection (DPS) |

Figure 5:
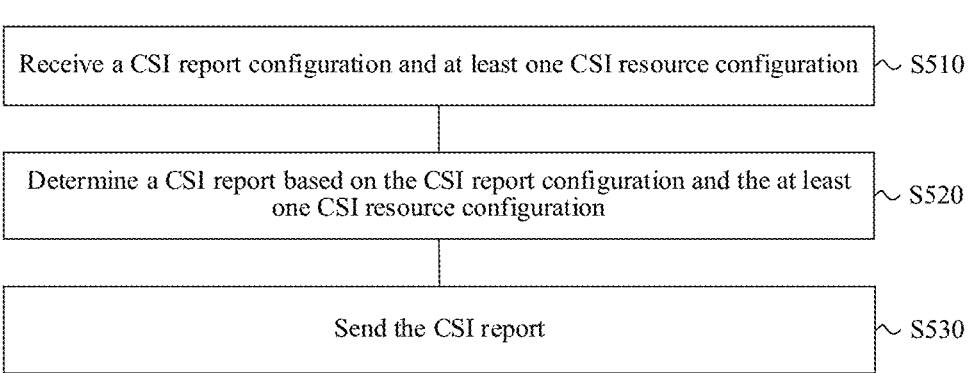
FIG. 5 is another schematic flowchart of a CSI report configuration method according to some embodiments of the present disclosure.

Corresponding to the CSI report configuration method described in the previous embodiment and applied at the network device side, FIG. 5 is a schematic flowchart for implementing the CSI report configuration method in the embodiment of the present disclosure, which can be applied at the terminal device side. As shown in FIG. 5, the method 500 includes:

S510: Receive a CSI report configuration and at least one CSI resource configuration.

S520: Determine a CSI report based on the CSI report configuration and the at least one CSI resource configuration.

S530: Send the CSI report.

In the embodiment of the present disclosure, a terminal device may receive a CSI report configuration and at least one CSI resource configuration from a network device, which is further used to indicate a CSI report configuration and a CSI resource for the terminal device, and a CSI report is determined based on the CSI report configuration and the at least one CSI resource configuration and sent, resolving the problem that a CSI report configuration under CSI resources with different spatial properties cannot be implemented, avoiding the transmission problems caused by inconsistent understanding of transmission between a terminal device and a network device, and improving communications effectiveness.

Alternatively, the CSI report is jointly determined by QCL CSI resources with different spatial properties.

Alternatively, the CSI report configuration is associated with multiple CSI resource configuration groups, and each CSI resource configuration group includes at least one CSI resource configuration; or a CSI resource configuration associated with the CSI report configuration includes multiple CSI resource sets; or one CSI resource set in a CSI resource configuration associated with the CSI report configuration includes multiple CSI resource subsets.

Alternatively, the multiple CSI resource configuration groups correspond to QCL CSI resources with different spatial properties respectively; or the multiple CSI resource sets correspond to QCL CSI resources with different spatial properties respectively; or the multiple CSI resource subsets correspond to QCL CSI resources with different spatial properties respectively.

Alternatively, the method 500 further includes:

obtaining a quantity of the multiple CSI resource configuration groups and a quantity of CSI resource configurations in each CSI resource configuration group, and/or information about a correspondence relationship between a CSI resource configuration group and a CSI resource configuration based on protocol provisions or based on configuration information from a network device;

obtaining a quantity of the multiple CSI resource sets and a quantity of CSI resources in each CSI resource set, and/or information about a correspondence relationship between a CSI resource set and a CSI resource based on protocol provisions or based on information from a network device; and obtaining a quantity of the multiple CSI resource subsets and a quantity of CSI resources in each CSI resource subset, and/or information about a correspondence relationship between a CSI resource subset and a CSI resource based on protocol provisions or based on configuration information from a network device.

Alternatively, each CSI resource configuration group of the multiple CSI resource configuration groups includes one to three CSI resource configurations, where:

if each CSI resource configuration group includes one CSI resource configuration, the CSI resource configuration is used for measuring CSI resource quality of a channel, for example, measuring L1-reference signal received power L1-RSRP;

if each CSI resource configuration group includes two CSI resource configurations, a first CSI resource configuration of the two CSI resource configurations is used for channel measurement, and a second CSI resource configuration is used for interference measurement based on channel state information interference measurement (CSI-IM) or interference measurement based on non-zero power channel state information-reference signal (NZP-CSI-RS); and if each CSI resource configuration group includes three CSI resource configurations, a first CSI resource configuration of the three CSI resource configurations is used for channel measurement, a second CSI resource configuration is used for CSI-IM-based interference measurement, and a third CSI resource configuration is used for NZP-CSI-RS-based interference measurement.

Alternatively, the method 500 further includes:

based on protocol provisions or based on CRI indication information from a network device, sending multiple groups of CRIs and/or CSI resource quality corresponding to each CRI in the multiple groups of CRIs, where the multiple groups of CRIs correspond to a preset CSI resource configuration group of the multiple CSI resource configuration groups, correspond to a preset CSI resource set of the multiple CSI resource sets, or correspond to a preset CSI resource subset of the multiple CSI resource subsets; or sending one group of CRIs and/or CSI resource quality corresponding to each CRI in the one group of CRIs, where the one group of CRIs correspond to one CSI resource configuration group of the multiple CSI resource configuration groups, correspond to one CSI resource set of the multiple CSI resource sets, or correspond to one CSI resource subset of the multiple CSI resource subsets; or sending one group of CRIs and/or CSI resource quality corresponding to each CRI in the one group of CRIs, where the one group of CRIs correspond to the multiple CSI resource configuration groups, correspond to the multiple CSI resource sets, or correspond to the multiple CSI resource subsets.

Alternatively, if the CSI report configuration is associated with a CSI-IM-based CSI resource configuration, the method 500 further includes:

receiving a CSI-IM-based CSI resource configured by a network device, where a CSI resource for channel measurement is in a correspondence relationship with the CSI-IM-based CSI resource; and/or, if the CSI report configuration is associated with an NZP-CSI-RS-based CSI resource configuration, the method 500 further includes: receiving a CSI resource for NZP-CSI-RS-based interference measurement configured by a network device, where a channel-measurement-based CSI resource is in a correspondence relationship with the CSI resource for NZP-CSI-RS-based interference measurement.

Alternatively, the CSI report includes at least one of the following: first report information and a channel quality indicator (CQI) jointly determined by multiple CRIs, CSI resource quality corresponding to the multiple CRIs, a rank indicator (RI), and a precoding matrix indicator (PMI), where the first report information includes: multiple groups of CRIs, CSI resource quality corresponding to the multiple groups of CRIs, multiple RIs, and multiple PMIs, and the first report information is determined by a preset CSI resource configuration group of the multiple CSI resource configuration groups, or determined by a preset CSI resource set of the multiple CSI resource sets, or determined by a preset CSI resource subset of the multiple CSI resource subsets; or, the CSI report includes at least one of the following: second report information and a CQI jointly determined by one CRI, CSI resource quality corresponding to the one CRI, an RI, and a PMI, where the second report information includes: one group of CRIs, CSI resource quality corresponding to the one group of CRIs, one RI, and one PMI, and the second report information is determined by one CSI resource configuration group of the multiple CSI resource configuration groups, or determined by one CSI resource set of the multiple CSI resource sets, or determined by one CSI resource subset of the multiple CSI resource subsets; or, the CSI report includes at least one of the following: third report information and a CQI jointly determined by multiple CRIs, CSI resource quality corresponding to the multiple CRIs, an RI and a PMI, where the third report information includes: one group of CRIs, CSI resource quality corresponding to the one group of CRIs, one RI, and one PMI, and the third report information is jointly determined by the multiple CSI resource configuration groups, determined by the multiple CSI resource sets, or determined by the multiple CSI resource subsets.

The CSI report configuration method according to the embodiment of the present disclosure has been described in detail above with reference to FIGS. 1-5. A terminal device according to an embodiment of the present disclosure will be described in detail below with reference to FIG. 6.

Figure 6:
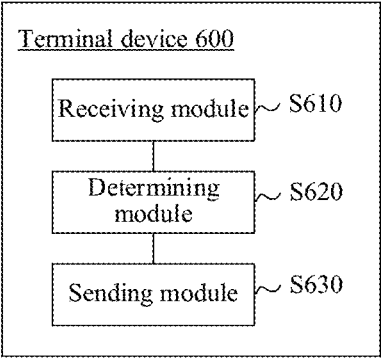
FIG. 6 is a schematic structural diagram of a terminal device according to some embodiments of the present disclosure.

FIG. 6 is a schematic structural diagram of a terminal device according to an embodiment of the present disclosure. As shown in FIG. 6, a terminal device 600 includes:

a receiving module 610, which may be configured to receive a CSI report configuration and at least one CSI resource configuration;

a determining module 620, which may be configured to determine a CSI report based on the CSI report configuration and the at least one CSI resource configuration; and a sending module 630, which may be configured to send the CSI report.

In the embodiment of the present disclosure, a terminal device may receive a CSI report configuration and a CSI resource configuration from a network device, which is further used to indicate a CSI report configuration and a CSI resource for the terminal device, and a CSI report is determined based on the CSI report configuration and the at least one CSI resource configuration and sent, resolving the problem that a CSI report configuration under CSI resources with different spatial properties cannot be implemented, avoiding the transmission problems caused by inconsistent understanding of transmission between a terminal device and a network device, and improving communications effectiveness.

Alternatively, the CSI report is jointly determined by QCL CSI resources with different spatial properties.

Alternatively, the CSI report configuration is associated with multiple CSI resource configuration groups, and each CSI resource configuration group includes at least one CSI resource configuration; or a CSI resource configuration associated with the CSI report configuration includes multiple CSI resource sets; or one CSI resource set in a CSI resource configuration associated with the CSI report configuration includes multiple CSI resource subsets.

Alternatively, the multiple CSI resource configuration groups correspond to QCL CSI resources with different spatial properties respectively; or the multiple CSI resource sets correspond to QCL CSI resources with different spatial properties respectively; or the multiple CSI resource subsets correspond to QCL CSI resources with different spatial properties respectively.

Alternatively, the terminal device 600 further includes an obtaining module configured to:

obtain a quantity of the multiple CSI resource configuration groups and a quantity of CSI resource configurations in each CSI resource configuration group, and/or information about a correspondence relationship between a CSI resource configuration group and a CSI resource configuration based on protocol provisions or based on configuration information from a network device;

obtain a quantity of the multiple CSI resource sets and a quantity of CSI resources in each CSI resource set, and/or information about a correspondence relationship between a CSI resource set and a CSI resource based on protocol provisions or based on configuration information from a network device; and obtain a quantity of the multiple CSI resource subsets and a quantity of CSI resources in each CSI resource subset, and/or information about a correspondence relationship between a CSI resource subset and a CSI resource based on protocol provisions or based on configuration information from a network device.

Alternatively, each CSI resource configuration group of the multiple CSI resource configuration groups includes one to three CSI resource configurations, where:

if each CSI resource configuration group includes one CSI resource configuration, the CSI resource configuration is used for measuring CSI resource quality of a channel, for example, measuring L1-reference signal received power L1-RSRP;

if each CSI resource configuration group includes two CSI resource configurations, a first CSI resource configuration of the two CSI resource configurations is used for channel measurement, and a second CSI resource configuration is used for interference measurement based on channel state information interference measurement (CSI-IM) or interference measurement based on non-zero power channel state information-reference signal (NZP-CSI-RS); and if each CSI resource configuration group includes three CSI resource configurations, a first CSI resource configuration of the three CSI resource configurations is used for channel measurement, a second CSI resource configuration is used for CSI-IM-based interference measurement, and a third CSI resource configuration is used for NZP-CSI-RS-based interference measurement.

Alternatively, the sending module 630 is further configured to:

based on protocol provisions or based on CRI indication information from a network device, send multiple groups of CRIs and/or CSI resource quality corresponding to each CRI in the multiple groups of CRIs, where the multiple groups of CRIs correspond to a preset CSI resource configuration group of the multiple CSI resource configuration groups, correspond to a preset CSI resource set of the multiple CSI resource sets, or correspond to a preset CSI resource subset of the multiple CSI resource subsets; or send one group of CRIs and/or CSI resource quality corresponding to each CRI in the one group of CRIs, where the one group of CRIs correspond to one CSI resource configuration group of the multiple CSI resource configuration groups, correspond to one CSI resource set of the multiple CSI resource sets, or correspond to one CSI resource subset of the multiple CSI resource subsets; or send one group of CRIs and/or CSI resource quality corresponding to each CRI in the one group of CRIs, where the one group of CRIs correspond to the multiple CSI resource configuration groups, correspond to the multiple CSI resource sets, or correspond to the multiple CSI resource subsets.

Alternatively, if the CSI report configuration is associated with a CSI-IM-based CSI resource configuration, the receiving module 610 may also be configured to obtain a correspondence relationship between the CSI resource configuration and the CSI-IM-based CSI resource configuration based on protocol provisions or the CSI report configuration information; and/or, if the CSI report configuration is associated with an NZP-CSI-RS-based CSI resource configuration, the receiving module 610 is further configured to receive a CSI resource for NZP-CSI-RS-based interference measurement configured by a network device, where a channel-measurement-based CSI resource is in a correspondence relationship with the CSI resource for NZP-CSI-RS-based interference measurement.

Alternatively, the CSI report includes at least one of the following: first report information and a channel quality indicator (CQI) jointly determined by multiple CRIs, CSI resource quality corresponding to multiple CRIs, a rank indicator (RI), and a precoding matrix indicator (PMI), where the first report information includes: multiple groups of CRIs, CSI resource quality corresponding to the multiple groups of CRIs, multiple RIs, and multiple PMIs, and the first report information is determined by a preset CSI resource configuration group of the multiple CSI resource configuration groups, or determined by a preset CSI resource set of the multiple CSI resource sets, or determined by a preset CSI resource subset of the multiple CSI resource subsets; or, the CSI report includes at least one of the following: second report information and a CQI jointly determined by one CRI, CSI resource quality corresponding to the one CRI, an RI, and a PMI, where the second report information includes: one group of CRIs, CSI resource quality corresponding to the one group of CRIs, one RI, and one PMI, and the second report information is determined by one CSI resource configuration group of the multiple CSI resource configuration groups, or determined by one CSI resource set of the multiple CSI resource sets, or determined by one CSI resource subset of the multiple CSI resource subsets; or, the CSI report includes at least one of the following: third report information and a channel quality indicator (CQI) jointly determined by multiple CRIs, CSI resource quality corresponding to the multiple CRIs, an RI and a PMI, where the third report information includes: one group of CRIs, CSI resource quality corresponding to the one group of CRIs, one RI, and one PMI, and the third report information is jointly determined by the multiple CSI resource configuration groups, determined by the multiple CSI resource sets, or determined by the multiple CSI resource subsets.

For the terminal device 600 according to the embodiment of the present disclosure, reference may be made to the corresponding procedure of the method 500 according to an embodiment of the present disclosure, and each unit/module in and the foregoing other operations and/or functions of the terminal device 600 are used to implement the corresponding procedure of the method 500, and will no longer be described here for the purpose of brevity.

Figure 7:
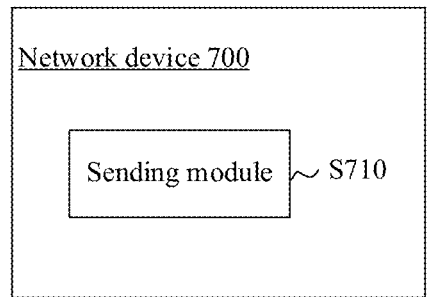
FIG. 7 is a schematic structural diagram of a network device according to some embodiments of the present disclosure.

FIG. 7 is a schematic structural diagram of a network device according to an embodiment of the present disclosure. As shown in FIG. 7, the network device 700 includes:

a sending module 710, which may be configured to send a CSI report configuration and at least one CSI resource configuration.

In the embodiment of the present disclosure, a network device can send, to a terminal device, a CSI report configuration and at least one CSI resource configuration, which are further used to indicate a CSI report configuration and a CSI resource for the terminal device, resolving the problem that a CSI report configuration under CSI resources with different spatial properties cannot be implemented, avoiding the transmission problem caused by inconsistent understanding of transmission between the terminal device and the network device, and enhancing communications effectiveness.

Alternatively, a CSI report corresponding to the CSI report configuration is jointly determined by quasi-co-located (QCL) CSI resources with different spatial properties.

Alternatively, the CSI report configuration is associated with multiple CSI resource configuration groups, and each CSI resource configuration group includes at least one CSI resource configuration; or a CSI resource configuration associated with the CSI report configuration includes multiple CSI resource sets; or one CSI resource set in a CSI resource configuration associated with the CSI report configuration includes multiple CSI resource subsets.

Alternatively, the multiple CSI resource configuration groups correspond to QCL CSI resources with different spatial properties respectively; or the multiple CSI resource sets correspond to QCL CSI resources with different spatial properties respectively; or the multiple CSI resource subsets correspond to QCL CSI resources with different spatial properties respectively.

Alternatively, the sending module 710 may further be configured to send configuration information for configuring a CSI resource configuration group; configuration information for configuring a CSI resource set; or configuration information for configuring a CSI resource subset, where the configuration information for configuring a CSI resource configuration group indicates a quantity of the CSI resource configuration groups and a quantity of CSI resource configurations in each CSI resource configuration group, and/or information about a correspondence relationship between a CSI resource configuration group and a CSI resource configuration;

the configuration information for configuring a CSI resource set indicates a quantity of the multiple CSI resource sets and a quantity of CSI resources in each CSI resource set, and/or information about a correspondence relationship between a CSI resource set and a CSI resource; and the configuration information for configuring a CSI resource subset indicates a quantity of the multiple CSI resource subsets and a quantity of CSI resources in each CSI resource subset, and/or information about a correspondence relationship between a CSI resource subset and a CSI resource.

Alternatively, each CSI resource configuration group of the multiple CSI resource configuration groups includes one to three CSI resource configurations.

If each CSI resource configuration group includes one CSI resource configuration, the CSI resource configuration is used for measuring CSI resource quality of a channel, for example, measuring L1-reference signal received power L1-RSRP;

if each CSI resource configuration group includes two CSI resource configurations, a first CSI resource configuration of the two CSI resource configurations is used for channel measurement, and a second CSI resource configuration is used for interference measurement based on channel state information interference measurement (CSI-IM) or interference measurement based on non-zero power channel state information-reference signal (NZP-CSI-RS); and if each CSI resource configuration group includes three CSI resource configurations, a first CSI resource configuration of the three CSI resource configurations is used for channel measurement, a second CSI resource configuration is used for CSI-IM-based interference measurement, and a third CSI resource configuration is used for NZP-CSI-RS-based interference measurement.

Alternatively, the sending module 710 is further configured to:

send channel state information-reference resource index CRI indication information.

The CRI indication information instructs a terminal device to send multiple groups of CRIs and/or CSI resource quality corresponding to each CRI in the multiple groups of CRIs, where the multiple groups of CRIs correspond to a preset CSI resource configuration group of the multiple CSI resource configuration groups, correspond to a preset CSI resource set of the multiple CSI resource sets, or correspond to a preset CSI resource subset of the multiple CSI resource subsets; or the CRI indication information instructs a terminal device to send one group of CRIs and/or CSI resource quality corresponding to each CRI in the one group of CRIs, where the one group of CRIs correspond to one CSI resource configuration group of the multiple CSI resource configuration groups, correspond to one CSI resource set of the multiple CSI resource sets, or correspond to one CSI resource subset of the multiple CSI resource subsets; or the CRI indication information instructs a terminal device to send one group of CRIs and/or CSI resource quality corresponding to each CRI in the one group of CRIs, where the one group of CRIs correspond to the multiple CSI resource configuration groups, correspond to the multiple CSI resource sets, or correspond to the multiple CSI resource subsets.

Alternatively, if the CSI report configuration is associated with a CSI-IM-based CSI resource configuration, the sending module 710 may further be configured to configure the terminal device with a CSI-IM-based CSI resource according to a correspondence relationship between the CSI resource for channel measurement and the CSI-IM-based CSI resource. If the CSI report configuration is associated with an NZP-CSI-RS-based CSI resource configuration, the sending module 710 may further be configured to configure the terminal device with a CSI resource for NZP-CSI-RS-based interference measurement according to a correspondence relationship between the CSI resource for channel measurement and the NZP-CSI-RS-based interference measurement CSI resource.

Alternatively, the CSI report configuration instructs a terminal device to calculate one CSI report based on multiple CSI resource configurations or multiple CSI resources.

Alternatively, the one CSI report includes at least one of the following: first report information and a channel quality indicator (CQI) jointly determined by multiple CRIs, CSI resource quality corresponding to the multiple CRIs, a rank indicator (RI), and a precoding matrix indicator (PMI), where the first report information includes: multiple groups of CRIs, CSI resource quality corresponding to the multiple groups of CRIs, multiple RIs, and multiple PMIs, and the first report information is determined by a preset CSI resource configuration group of the multiple CSI resource configuration groups, or determined by a preset CSI resource set of the multiple CSI resource sets, or determined by a preset CSI resource subset of the multiple CSI resource subsets; or, The one CSI report includes at least one of the following: second report information and a CQI jointly determined by one CRI, CSI resource quality corresponding to the one CRI, an RI, and a PMI, where the second report information includes: one group of CRIs, CSI resource quality corresponding to the one group of CRIs, one RI, and one PMI, and the second report information is determined by one CSI resource configuration group of the multiple CSI resource configuration groups, or determined by one CSI resource set of the multiple CSI resource sets, or determined by one CSI resource subset of the multiple CSI resource subsets; or, The one CSI report includes at least one of the following: third report information and a channel quality indicator (CQI) jointly determined by multiple CRIs, CSI resource quality corresponding to the multiple CRIs, an RI and a PMI, where the third report information includes: one group of CRIs, CSI resource quality corresponding to the one group of CRIs, one RI, and one PMI, and the third report information is jointly determined by the multiple CSI resource configuration groups, determined by the multiple CSI resource sets, or determined by the multiple CSI resource subsets.

For the network device 700 according to the embodiment of the present disclosure, reference may be made to the corresponding procedure of a method 100 according to an embodiment of the present disclosure, and each unit/module in and the foregoing other operations and/or functions of the network device 700 are used to implement the corresponding procedure of the method 100, and will no longer be described here for the purpose of brevity.

Figure 8:
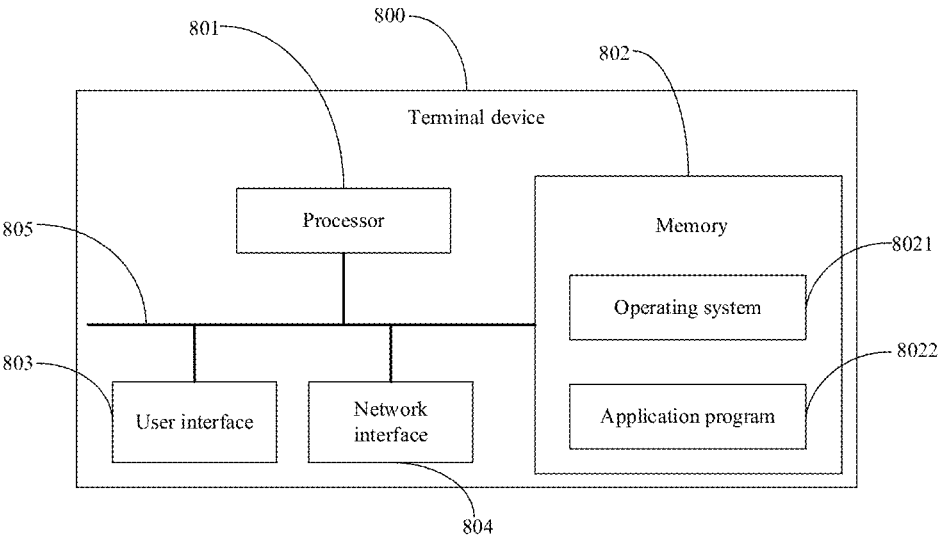
FIG. 8 is another schematic structural diagram of a terminal device according to some embodiments of the present disclosure.

FIG. 8 is another structural diagram of a terminal device according to an embodiment of the present disclosure. As shown in FIG. 8, the terminal device 800 includes: at least one processor 801, a memory 802, at least one network interface 804, and a user interface 803. Various components of the terminal device 800 are coupled by using a bus system 805. It may be understood that the bus system 805 is configured to implement a connection and communication between these components. In addition to a data bus, the bus system 805 may include a power bus, a control bus, and a status signal bus. However, for clarity of description, various buses are marked as the bus system 805 in FIG. 8.

The user interface 803 may include a display, a keyboard, or a clicking device, for example, a mouse, a trackball, a touch panel, or a touchscreen.

It may be understood that the memory 802 in this embodiment of the present disclosure may be a volatile memory or a nonvolatile memory, or may include both a volatile memory and a nonvolatile memory. Among them, the nonvolatile memory can be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), and is used as an external cache. As exemplary but not limitative descriptions, many forms of RAMs may be used, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 802 in the system and the method that are described in this embodiment of the present disclosure is to include but is not limited to these memories and a memory of any other proper type.

In some implementations, the memory 802 stores the following element: an executable module or a data structure, a subset thereof, or an extended set thereof: an operating system 8021 and an application program 8022.

The operating system 8021 includes various system programs, for example, a framework layer, a kernel library layer, and a driver layer, and is configured to implement various basic services and process hardware-based tasks. The application program 8022 includes various application programs, for example, a media player and a browser, and is configured to implement various application services. A program for implementing the method in the embodiments of the present disclosure may be included in the application program 8022.

In the embodiments of the present disclosure, the terminal device 800 further includes: a computer program stored in the memory 802 and executable on the processor 801. When the computer program is executed by the processor 801, the steps of the method 500 are performed as follows.

The method disclosed in the embodiment of the present disclosure may be applied to the processor 801 or implemented by the processor 801. The processor 801 may be an integrated circuit chip having a signal processing capability. During implementation, the steps of the foregoing method can be completed by hardware integrated logic circuits in the processor 801 or indications in the form of software. The foregoing processor 801 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 801 may implement or execute the methods, steps, and logic block diagrams disclosed in the embodiments of the present disclosure. The general-purpose processor may be a microprocessor or may be any conventional processor or the like. The steps of the method disclosed in the embodiments of the present disclosure may be directly performed by a hardware decoding processor or by a combination of hardware and software modules in the decoding processor. The software module may be located in a mature computer readable storage medium in this field such as a random access memory, a flash memory, a read-only memory, a programmable read-only memory or an electrically erasable programmable memory, or a register. The computer readable storage medium is located in the memory 802, and the processor 801 reads information from the memory 802 and completes the steps of the foregoing method in combination with its hardware. Specifically, the computer readable storage medium stores a computer program, and when the computer program is executed by the processor 801, the steps of the foregoing embodiment of method 500 are performed.

It can be understood that those embodiments described in the embodiments of the present disclosure can be implemented with hardware, software, firmware, middleware, microcode, or a combination thereof. For implementation with hardware, the processing unit may be implemented in multiple application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation with software, the technology described in the embodiments of the present disclosure may be implemented by executing functional modules (for example, a process and a function) described in the embodiments of the present disclosure. Software codes can be stored in the memory and executed by the processor. The memory can be implemented inside or outside the processor.

The terminal device 800 can implement each process implemented by the terminal device in the foregoing embodiments. To avoid repetition, details are not described herein again.

Figure 9:
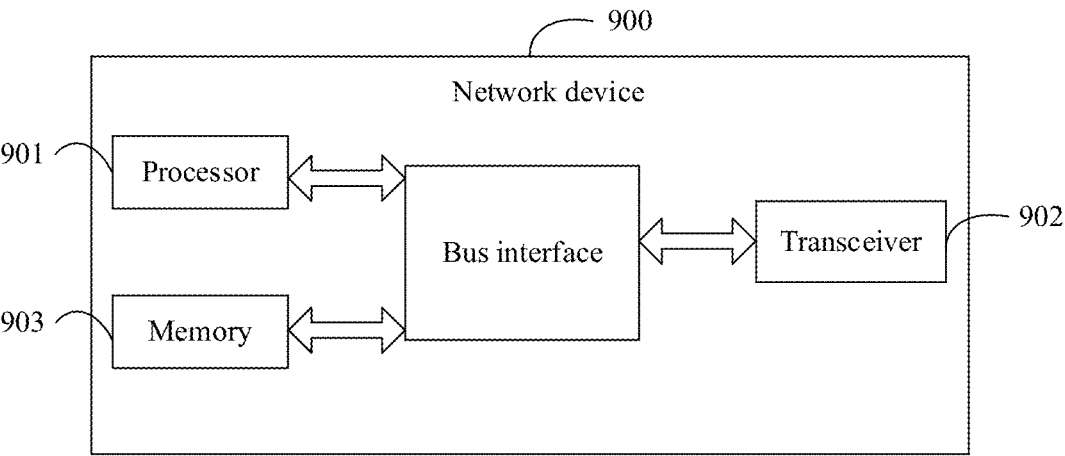
FIG. 9 is another schematic structural diagram of a network device according to some embodiments of the present disclosure.

Refer to FIG. 9, which is a structural diagram of a network side device applied in this embodiment of the present disclosure. The network side device can implement details of the embodiment of a method 100, and achieve a same effect. As shown in FIG. 9, a network side device 900 includes a processor 901, a transceiver 902, a memory 903, and a bus interface.

In this embodiment of the present disclosure, the network side device 900 further includes: a computer program stored in the memory 903 and executable on the processor 901. When the computer program is executed by the processor 901, the steps of the method 100 are performed.

In FIG. 9, the bus architecture may include any quantity of interconnected buses and bridges, which are specifically connected together by various circuits of multiple processors represented by the processor 901 and a memory represented by the memory 903. The bus architecture may further connect together various other circuits of a peripheral device, a voltage stabilizer, a power management circuit, and the like, which are known in this art and will not be further described herein. The bus interface provides an interface. The transceiver 902 may include multiple elements, that is, include a transmitter and a receiver, and provide units for communication with various other apparatuses on a transmission medium.

The processor 901 is responsible for managing the bus architecture and common processing, and the memory 903 may store data used when the processor 901 performs an operation.

This embodiment of the present disclosure further provides a computer readable storage medium. The computer readable storage medium stores a computer program, and when the computer program is executed by a processor, the processes in the embodiment of the method 100 and the embodiment of the method 500 are implemented, and a same technical effect can be achieved. To avoid repetition, details are not described herein. The computer readable storage medium is, for example, a read-only memory (ROM), a random access memory (RAM), a magnetic disk, or an optical disk.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. Without being subject to further limitations, an element defined by a phrase "including a . . . " does not exclude presence of other identical elements in the process, method, article, or apparatus that includes the very element.

According to the foregoing descriptions of the implementations, a person skilled in the art may clearly understand that the foregoing methods in the embodiments may be implemented by using software and a required universal hardware platform, or certainly may be implemented by using hardware. However, in many cases, the former is a better implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described with reference to the accompanying drawings. However, the present disclosure is not limited to the foregoing specific implementations. The foregoing specific implementations are merely an example, but are not limiting. A person of ordinary skill in the art may make many forms without departing from the objective and the scope of the claims of the present disclosure.

What is claimed is:

1. A channel state information (CSI) report configuration method performed by a network device, the method comprising:
   sending a CSI report configuration and at least one CSI resource configuration, wherein the at least one CSI resource configuration indicates a CSI resource set that comprises multiple CSI resource subsets, wherein the multiple CSI resource subsets correspond to quasi co-located (QCL) CSI resources with different spatial properties respectively; and
   receiving a CSI report comprising report information determined based on the multiple CSI resource subsets.

2. The method according to claim 1, wherein the CSI report comprises a group of channel state information-reference resource indices (CRIs), CSI resource quality corresponding to the group of CRIs, multiple precoding matrix indicators (PMIs) corresponding to the group of CRIs respectively, and multiple rank indicators (RIs) corresponding to the multiple PMIs respectively.

3. The method according to claim 2, wherein the CSI report further comprises a channel quality indicator (CQI) jointly determined by multiple CRIs.

4. The method according to claim 1, wherein:
   the CSI report configuration is associated with multiple CSI resource configuration groups, and one of the CSI resource configuration groups comprises the at least one CSI resource configuration; or
   the at least one CSI resource configuration associated with the CSI report configuration comprises multiple CSI resource sets.

5. The method according to claim 4, wherein:
   the multiple CSI resource configuration groups correspond to QCL CSI resources with different spatial properties respectively; or
   the multiple CSI resource sets correspond to QCL CSI resources with different spatial properties respectively.

6. The method according to claim 4, further comprising:
   sending first configuration information used to configure the multiple CSI resource configuration groups, wherein the first configuration information indicates a quantity of the multiple CSI resource configuration groups and a quantity of CSI resource configurations in each CSI resource configuration group, or information about a correspondence relationship between the multiple CSI resource configuration groups and the CSI resource configurations; or
   sending second configuration information used to configure the multiple CSI resource sets, wherein the second configuration information indicates a quantity of the multiple CSI resource sets and a quantity of CSI resources in each CSI resource set, or information about a correspondence relationship between the multiple CSI resource sets and the CSI resources; or
   sending third configuration information used to configure the multiple CSI resource subsets, wherein the third configuration information indicates a quantity of the multiple CSI resource subsets and a quantity of CSI resources in each CSI resource subset, or information about a correspondence relationship between the multiple CSI resource subsets and the CSI resources.

7. The method according to claim 6, wherein each CSI resource configuration group of the multiple CSI resource configuration groups comprises one to three CSI resource configurations, wherein:
   if each CSI resource configuration group comprises one CSI resource configuration, the one CSI resource configuration is used for measuring CSI resource quality of a channel;
   if each CSI resource configuration group comprises two CSI resource configurations, a first one of the two CSI resource configurations is used for a channel measurement, and a second one of the two CSI resource configurations is used for interference measurement based on channel state information interference measurement (CSI-IM) or interference measurement based on non-zero power channel state information-reference signal (NZP-CSI-RS); and
   if each CSI resource configuration group comprises three CSI resource configurations, a first one of the three CSI resource configurations is used for the channel measurement, a second one of the three CSI resource configurations is used for the CSI-IM-based interference measurement, and a third one of the three CSI resource configurations is used for the NZP CSI-RS-based interference measurement.

8. The method according to claim 7, wherein:
   if the CSI report configuration is associated with a CSI-IM-based CSI resource configuration, the method further comprises sending a CSI-IM-based CSI resource, wherein a channel-measurement-based CSI resource is in a correspondence relationship with the CSI-IM-based CSI resource; or
   if the CSI report configuration is associated with an NZP-CSI-RS-based CSI resource configuration, the method further comprises sending a CSI resource for NZP-CSI-RS-based interference measurement, wherein the channel-measurement-based CSI resource is in a correspondence relationship with the CSI resource for NZP-CSI-RS-based interference measurement.

9. The method according to claim 4, further comprising:
   sending channel state information-reference resource index (CRI) indication information,
   wherein the CRI indication information instructs a terminal device to send multiple groups of CRIs or CSI resource quality corresponding to each CRI in the multiple groups of CRIs, wherein the multiple groups of CRIs correspond to a preset CSI resource configuration group of the multiple CSI resource configuration groups, correspond to a preset CSI resource set of the multiple CSI resource sets, or correspond to a preset CSI resource subset of the multiple CSI resource subsets; or
   wherein the CRI indication information instructs the terminal device to send one group of CRIs or CSI resource quality corresponding to each CRI in the one group of CRIS, wherein the one group of CRIs corresponds to one CSI resource configuration group of the multiple CSI resource configuration groups, corresponds to one CSI resource set of the multiple CSI resource sets, or corresponds to one CSI resource subset of the multiple CSI resource subsets; or
   wherein the CRI indication information instructs the terminal device to send one group of CRIs or CSI resource quality corresponding to each CRI in the one group of CRIs, wherein the one group of CRIs corresponds to the multiple CSI resource configuration groups, corresponds to the multiple CSI resource sets, or corresponds to the multiple CSI resource subsets.

10. The method according to claim 1, wherein:

the CSI report comprises first report information and a channel quality indicator (CQI) jointly determined by multiple channel state information-reference resource indices (CRIs), CSI resource quality corresponding to multiple CRIs, a rank indicator (RI), and a precoding matrix indicator (PMI), wherein the first report information comprises multiple groups of CRIs, CSI resource quality corresponding to the multiple groups of CRIs, multiple RIs, and multiple PMIs, wherein the first report information is determined by a preset CSI resource configuration group of multiple CSI resource configuration groups, or determined by a preset CSI resource set of the multiple CSI resource sets, or determined by a preset CSI resource subset of the multiple CSI resources subsets; or the CSI report comprises second report information and a CQI jointly determined by one CRI, CSI resource quality corresponding to the one CRI, the RI, and the PMI, wherein the second report information comprises one group of CRIs, CSI resource quality corresponding to the one group of CRIs, the RI, and the PMI, wherein the second report information is determined by one CSI resource configuration group of the multiple CSI resource configuration groups, or determined by one CSI resource set of the multiple CSI resource sets, or determined by one CSI resource subset of the multiple CSI resource subsets; or the CSI report comprises third report information and a CQI jointly determined by the multiple CRIs, CSI resource quality corresponding to the multiple CRIs, the RI, and the PMI, wherein the third report information comprises one group of CRIs, CSI resource quality corresponding to the one group of CRIs, the RI, and the PMI, wherein the third report information is jointly determined by the multiple CSI resource configuration groups, determined by the multiple CSI resource sets, or determined by the multiple CSI resource subsets.

11. A network device, comprising:

a memory configured to store a computer program; and a processor configured to execute the computer program to implement operations comprising:

sending a channel state information (CSI) report configuration and at least one CSI resource configuration, wherein the at least one CSI resource configuration indicates a CSI resource set that comprises multiple CSI resource subsets, wherein the multiple CSI resource subsets correspond to quasi co-located (QCL) CSI resources with different spatial properties respectively; and receiving a CSI report comprising report information determined based on the multiple CSI resource subsets.

12. The network device according to claim 11, wherein the CSI report comprises a group of channel state information-reference resource indices (CRIs), CSI resource quality corresponding to the group of CRIs, multiple precoding matrix indicators (PMIs) corresponding to the group of CRIs respectively, and multiple rank indicators (RIs) corresponding to the multiple PMIs respectively.

13. The network device according to claim 12, wherein the CSI report further comprises a channel quality indicator (CQI) jointly determined by multiple CRIs.

14. The network device according to claim 11, wherein:

the CSI report configuration is associated with multiple CSI resource configuration groups, and one of the CSI resource configuration groups comprises the at least one CSI resource configuration; or the CSI resource configuration associated with the CSI report configuration comprises multiple CSI resource sets.

15. The network device according to claim 14, wherein:

the multiple CSI resource configuration groups correspond to QCL CSI resources with different spatial properties respectively; or the multiple CSI resource sets correspond to QCL CSI resources with different spatial properties respectively.

16. The network device according to claim 14, wherein the operations further comprise:

sending first configuration information used to configure the multiple CSI resource configuration groups, wherein the first configuration information indicates a quantity of the multiple CSI resource configuration groups and a quantity of CSI resource configurations in each CSI resource configuration group, or information about a correspondence relationship between the multiple CSI resource configuration groups and the CSI resource configurations; or sending second configuration information used to configure the multiple CSI resource sets, wherein the second configuration information indicates a quantity of the multiple CSI resource sets and a quantity of CSI resources in each CSI resource set, or information about a correspondence relationship between the multiple CSI resource sets and the CSI resources; or sending third configuration information used to configure the multiple CSI resource subsets, wherein the third configuration information indicates a quantity of the multiple CSI resource subsets and a quantity of CSI resources in each CSI resource subset, or information about a correspondence relationship between the multiple CSI resource subsets and the CSI resources.

17. The network device according to claim 16, wherein each CSI resource configuration group of the multiple CSI resource configuration groups comprises one to three CSI resource configurations, wherein:

if each CSI resource configuration group comprises one CSI resource configuration, the one CSI resource configuration is used for measuring CSI resource quality of a channel;

if each CSI resource configuration group comprises two CSI resource configurations, a first one of the two CSI resource configurations is used for a channel measurement, and a second one of the two CSI resource configurations is used for interference measurement based on channel state information interference measurement (CSI-IM) or interference measurement based on non-zero power channel state information-reference signal (NZP-CSI-RS); and if each CSI resource configuration group comprises three CSI resource configurations, a first one of the three CSI resource configurations is used for the channel measurement, a second one of the three CSI resource configurations is used for the CSI-IM-based interference measurement, and a third one of the three CSI resource configurations is used for the NZP CSI-RS-based interference measurement.

18. The network device according to claim 17, wherein:

if the CSI report configuration is associated with a CSI-IM-based CSI resource configuration, the operations further comprise sending a CSI-IM-based CSI resource, wherein a channel-measurement-based CSI resource is in a correspondence relationship with the CSI-IM-based CSI resource; or if the CSI report configuration is associated with an NZP-CSI-RS-based CSI resource configuration, the operations further comprise sending a CSI resource for NZP-CSI-RS-based interference measurement, wherein the channel-measurement-based CSI resource is in a correspondence relationship with the CSI resource for NZP-CSI-RS-based interference measurement.

19. The network device according to claim 14, wherein the operations further comprise:

sending channel state information-reference resource index (CRI) indication information, wherein the CRI indication information instructs a terminal device to send multiple groups of CRIs or CSI resource quality corresponding to each CRI in the multiple groups of CRIs, wherein the multiple groups of CRIs correspond to a preset CSI resource configuration group of the multiple CSI resource configuration groups, correspond to a preset CSI resource set of the multiple CSI resource sets, or correspond to a preset CSI resource subset of the multiple CSI resource subsets; or wherein the CRI indication information instructs the terminal device to send one group of CRIs or CSI resource quality corresponding to each CRI in the one group of CRIs, wherein the one group of CRIs corresponds to one CSI resource configuration group of the multiple CSI resource configuration groups, corresponds to one CSI resource set of the multiple CSI resource sets, or corresponds to one CSI resource subset of the multiple CSI resource subsets; or wherein the CRI indication information instructs the terminal device to send one group of CRIs or CSI resource quality corresponding to each CRI in the one group of CRIs, wherein the one group of CRIs corresponds to the multiple CSI resource configuration groups, corresponds to the multiple CSI resource sets, or corresponds to the multiple CSI resource subsets.

20. A non-transitory computer readable storage medium, storing a computer program that, when executed by a processor, causes the processor to implement operations comprising:

sending a channel state information (CSI) report configuration and at least one CSI resource configuration, wherein the at least one CSI resource configuration indicates a CSI resource set that comprises multiple CSI resource subsets, wherein the multiple CSI resource subsets correspond to quasi co-located (QCL) CSI resources with different spatial properties respectively; and receiving a CSI report comprising report information determined based on the multiple CSI resource subsets.

* * * * *